(12) United States Patent
Fuchie et al.

(10) Patent No.: US 8,509,556 B2
(45) Date of Patent: Aug. 13, 2013

(54) IMAGE CODING APPARATUS AND IMAGE CODING METHOD TO GENERATE A TARGETED AMOUNT OF CODE

(75) Inventors: Takaaki Fuchie, Kanagawa (JP); Shojiro Shibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1107 days.

(21) Appl. No.: 12/207,611

(22) Filed: Sep. 10, 2008

(65) Prior Publication Data

US 2009/0067738 A1    Mar. 12, 2009

(30) Foreign Application Priority Data

Sep. 12, 2007  (JP) ................ P2007-236946

(51) Int. Cl.
*G06K 9/36* (2006.01)
*G06K 9/46* (2006.01)

(52) U.S. Cl.
USPC ........................................................ 382/251

(58) Field of Classification Search
USPC ................. 382/232, 233, 238, 239, 250, 251;
375/240.03, 240.12, 240.16, 240.18, 240.22,
375/E7.026, E7.123, E7.212, E7.226
See application file for complete search history.

(56) References Cited

U.S. PATENT DOCUMENTS

| | | | |
|---|---|---|---|
| 4,791,483 A | 12/1988 | Miller | |
| 5,073,820 A | 12/1991 | Nakagawa et al. | |
| 5,245,427 A | 9/1993 | Kunihiro | |
| 5,528,298 A | 6/1996 | Enari et al. | |
| 5,604,494 A | 2/1997 | Murakami et al. | |
| 5,612,900 A | 3/1997 | Azadegan et al. | |
| 5,703,646 A | 12/1997 | Oda | |
| 5,721,589 A | 2/1998 | Murata | |
| 5,838,826 A | 11/1998 | Enari et al. | |
| 5,870,145 A | 2/1999 | Yada et al. | |
| 5,933,532 A | 8/1999 | Mihara | |

(Continued)

FOREIGN PATENT DOCUMENTS

| | | |
|---|---|---|
| CN | 1195943 | 10/1998 |
| CN | 1241336 | 1/2000 |

(Continued)

OTHER PUBLICATIONS

Viscito E. et al.: "A Video Compression Algorithm with Adaptive Bit Allocation and Quantization", Visual Communication and Image Processing '91: Visual Communication. Boston, Nov. 11-13, 1991; [Proceedings of SPIE], Bellingham, SPIE, US, vol. 1605 Part 01/02, Nov. 11, 1991, pp. 58-72, XP000479218.

(Continued)

*Primary Examiner* — Amir Alavi
(74) *Attorney, Agent, or Firm* — Frommer Lawrence & Haug LLP; William S. Frommer; Paul A. Levy

(57) ABSTRACT

An image coding apparatus for coding image data. The image coding apparatus includes: a first coding mechanism predicting a quantization parameter and a quantization matrix to be used for calculating a target amount of code for the image data by coding the image data; a second coding mechanism correcting the quantization parameter predicted by the first coding means from an error between an amount of generated code produced by coding using the quantization parameter and the quantization matrix predicted by the first coding mechanism and the target amount of code; and a third coding mechanism coding the image data using the quantization parameter corrected by the second coding mechanism.

8 Claims, 13 Drawing Sheets

(56) References Cited

U.S. PATENT DOCUMENTS

| | | | |
|---|---|---|---|
| 6,014,467 A | 1/2000 | Asano | |
| 6,023,297 A | 2/2000 | Kobayashi | |
| 6,052,488 A | 4/2000 | Takahashi et al. | |
| 6,100,931 A | 8/2000 | Mihara | |
| 6,163,573 A | 12/2000 | Mihara | |
| 6,337,879 B1 | 1/2002 | Mihara et al. | |
| 6,404,933 B1 | 6/2002 | Yamamoto | |
| 6,438,167 B1 | 8/2002 | Shimizu et al. | |
| 6,493,384 B1 | 12/2002 | Mihara | |
| 6,678,322 B1 | 1/2004 | Mihara | |
| 6,934,330 B2 | 8/2005 | Sugiyama et al. | |
| 7,286,715 B2 | 10/2007 | Togashi et al. | |
| 7,313,184 B2 | 12/2007 | Mihara | |
| RE40,679 E | 3/2009 | Oda | |
| 7,885,471 B2* | 2/2011 | Segall | 382/232 |
| 2003/0016878 A1 | 1/2003 | Motosu et al. | |
| 2005/0180505 A1 | 8/2005 | Ogawa et al. | |
| 2005/0259730 A1* | 11/2005 | Sun | 375/240.03 |
| 2006/0062481 A1* | 3/2006 | Suvanto | 382/239 |
| 2006/0171460 A1 | 8/2006 | Masuda et al. | |
| 2007/0071094 A1 | 3/2007 | Takeda et al. | |
| 2007/0201553 A1 | 8/2007 | Shindo | |
| 2008/0279275 A1 | 11/2008 | Suzuki | |
| 2009/0067738 A1* | 3/2009 | Fuchie et al. | 382/251 |
| 2010/0098173 A1* | 4/2010 | Horiuchi et al. | 375/240.18 |
| 2010/0118971 A1 | 5/2010 | Tanida et al. | |
| 2010/0135386 A1 | 6/2010 | Shibata et al. | |
| 2010/0266047 A1* | 10/2010 | Takahashi et al. | 375/240.22 |
| 2011/0090960 A1* | 4/2011 | Leontaris et al. | 375/240.12 |
| 2011/0103480 A1* | 5/2011 | Dane | 375/240.16 |
| 2011/0188769 A1* | 8/2011 | Fuchie et al. | 382/252 |
| 2011/0200266 A1* | 8/2011 | Fuchie et al. | 382/251 |

FOREIGN PATENT DOCUMENTS

| | | |
|---|---|---|
| CN | 1642285 | 7/2005 |
| EP | 0 871 333 | 10/1998 |
| EP | 0 892 561 | 1/1999 |
| EP | 1 555 831 | 7/2005 |
| EP | 2 028 865 | 2/2009 |
| JP | 4 114585 | 4/1992 |
| JP | 4135427 | 5/1992 |
| JP | 6 350985 | 12/1994 |
| JP | 7 123273 | 5/1995 |
| JP | 7 322252 | 12/1995 |
| JP | 8 65677 | 3/1996 |
| JP | 8 115205 | 5/1996 |
| JP | 9-247675 | 9/1997 |
| JP | 10 023413 | 1/1998 |
| JP | 10 174098 | 6/1998 |
| JP | 10 341435 | 12/1998 |
| JP | 11 98502 | 4/1999 |
| JP | 2000 261805 | 9/2000 |
| JP | 2000 270323 | 9/2000 |
| JP | 3264043 | 12/2001 |
| JP | 3358620 | 10/2002 |
| JP | 2002 359853 | 12/2002 |
| JP | 2004 007475 | 1/2004 |
| JP | 2004 56680 | 2/2004 |
| JP | 3561962 | 6/2004 |
| JP | 2005 203905 | 7/2005 |
| JP | 2006 67302 | 3/2006 |
| JP | 2006 222555 | 8/2006 |
| JP | 2007 158430 | 6/2007 |
| KR | 10-0264710 | 9/2000 |
| KR | 10-2005-00742 86 | 7/2005 |
| WO | WO 98/26602 | 6/1998 |
| WO | WO 99/07158 | 2/1999 |
| WO | WO 2008 065814 | 6/2008 |

OTHER PUBLICATIONS

Office Action documents for corresponding Chinese patent application issued on Feb. 24, 2010 and it's English translation.
Joint Video Team (JVT) of ISO/IEC MPEG and ITU-T VCEG, document JVT-C028, Virginia, May 2002.
Joint Final Committee Draft (JFCD) of Joint Video Specification (ITU-T Rec. H. 264/ISO/IEC 14496-10 AVE) (JVTD157), [online], ITU-T /ISO/IEC, 2002.07.22, URL:http://wftp3.itu.int/av-arch/jvt-site/2002_07_Klagenfurt/JVT-D157.zip, p. i, 83-90.

* cited by examiner

IMAGE CODING APPARATUS AND IMAGE CODING METHOD TO GENERATE A TARGETED AMOUNT OF CODE

CROSS REFERENCES TO RELATED APPLICATIONS

The present invention contains subject matter related to Japanese Patent Application JP 2007-236946 filed in the Japanese Patent Office on Sep. 12, 2007, the entire contents of which are incorporated herein by reference.

BACKGROUND OF THE INVENTION

1. Field of the Invention

The present invention relates to an image coding apparatus, etc., for example. More particularly, the present invention relates to a technical field in which an amount of generated code is matched with a target amount of code given to one picture without performing intra-frame feedback control.

2. Description of the Related Art

To date, in a system, etc., for transmitting bit streams of moving images, or recording the images onto a recording medium, highly-efficient coding has been performed in order to effectively use a transmission path or a recording capacity. In an image coding apparatus achieving this, a coding bit rate of the bit streams generated by an encoder is controlled to be constant to meet the transfer rate of a transmission medium. With this restriction, the amount of generated data, that is to say, the quantization step of quantization in the encoder is controlled. That is to say, for example, if an image having a complicated design pattern continues, the quantization step is determined to be large in order to reduce the amount of generated data. On the contrary, if a simple design pattern continues, the quantization step is determined to be small in order to increase the amount of generated data. Thus, the overflow or underflow of the buffer memory is prevented from occurring in order to maintain a fixed rate.

Accordingly, in an image coding apparatus according to such a related-art technique, when a complicated image continues, the step of quantization becomes large, deteriorating the image quality. Also, when a simple image continues, the step of quantization becomes small. Thus, it has been difficult to obtain an equal image quality through the overall images. In view of this problem, for example, Japanese Patent No. 3358620 has disclosed an image coding apparatus which calculates the amount of code to be allocated to each GOP (Group Of Picture) depending on the complexity of an image included in the GOP. The amount of code is calculated in such a way that if a GOP includes an image with a complicated design pattern, a large amount of code is allocated, and if a GOP includes an image with a simple design pattern, a small amount of code is allocated. The allocation is carried out in accordance with the ratio of the difficulty of coding each GOP to the sum total of the difficulties of coding a plurality of GOPs.

On the other hand, for a method of matching the amount of generated code with a target amount of code given to one picture, the step2 of TM5 (test model 5) is well used. This is a method in which the amount of code allocated to a picture is evenly divided among macro blocks (MB), the divided amount is used as a target amount of code for the MB, and feedback control is performed in the picture in order to meet the target.

SUMMARY OF THE INVENTION

However, in a method, such as the step2 of TM5, in encoding a beginning picture of a sequence and a picture immediately after a scene change, an initial value of the quantization parameter does not match the design pattern of that picture, and thus the image quality sometimes deteriorates.

For example, if a quantization parameter is too large for a part before the feedback follows the design pattern of that part, the image quality of that part deteriorates compared with the other parts. On the contrary, if a quantization parameter is too small, the amount of code is too much wasted for that part, giving bad influence on the other parts. Also, since the target amount of code for a MB is kept constant all the time, and thus if there is a deviation of difficulty in an image of a picture, and the like, the amount of code is allocated inappropriately.

It is therefore desirable to match the amount of generated code with a target amount of code, and to allocate the amount of code in consideration of visual characteristics, that is to say, to determine the quantization parameters.

According to an embodiment of the present invention, there is provided an image coding apparatus for coding image data, including: first coding means for predicting a quantization parameter and a quantization matrix to be used for calculating a target amount of code for the image data by coding the image data; second coding means for correcting the quantization parameter predicted by the first coding means from an error between an amount of generated code produced by coding using the quantization parameter and the quantization matrix predicted by the first coding means and the target amount of code; and third coding means for coding the image data using the quantization parameter corrected by the second coding means.

Accordingly, by the first and the second coding means, the quantization parameter is calculated so as to match the amount of generated code with the target amount of code, and the coding is performed using the quantization parameter.

According to another embodiment of the present invention, there is provided a method of coding an image, including the steps of: first coding for predicting a quantization parameter and a quantization matrix to be used for calculating a target amount of code for the image data by coding the image data; second coding for correcting the quantization parameter predicted by the step of first coding from an error between an amount of generated code produced by coding using the quantization parameter and the quantization matrix predicted by the step of first coding and the target amount of coding; and third coding for coding the image data using the quantization parameter corrected by the step of second coding.

Accordingly, the quantization parameter is calculated so as to match the amount of generated code with the target amount of code, and the coding is performed using the quantization parameter.

By the present invention it is possible to provide an image coding apparatus and an image coding method which match the amount of generated code with a target amount of code and allocate the amount of code in consideration of visual characteristics, that is to say, the determination of the quantization parameter.

DESCRIPTION OF THE PREFERRED EMBODIMENTS

Figure 1:
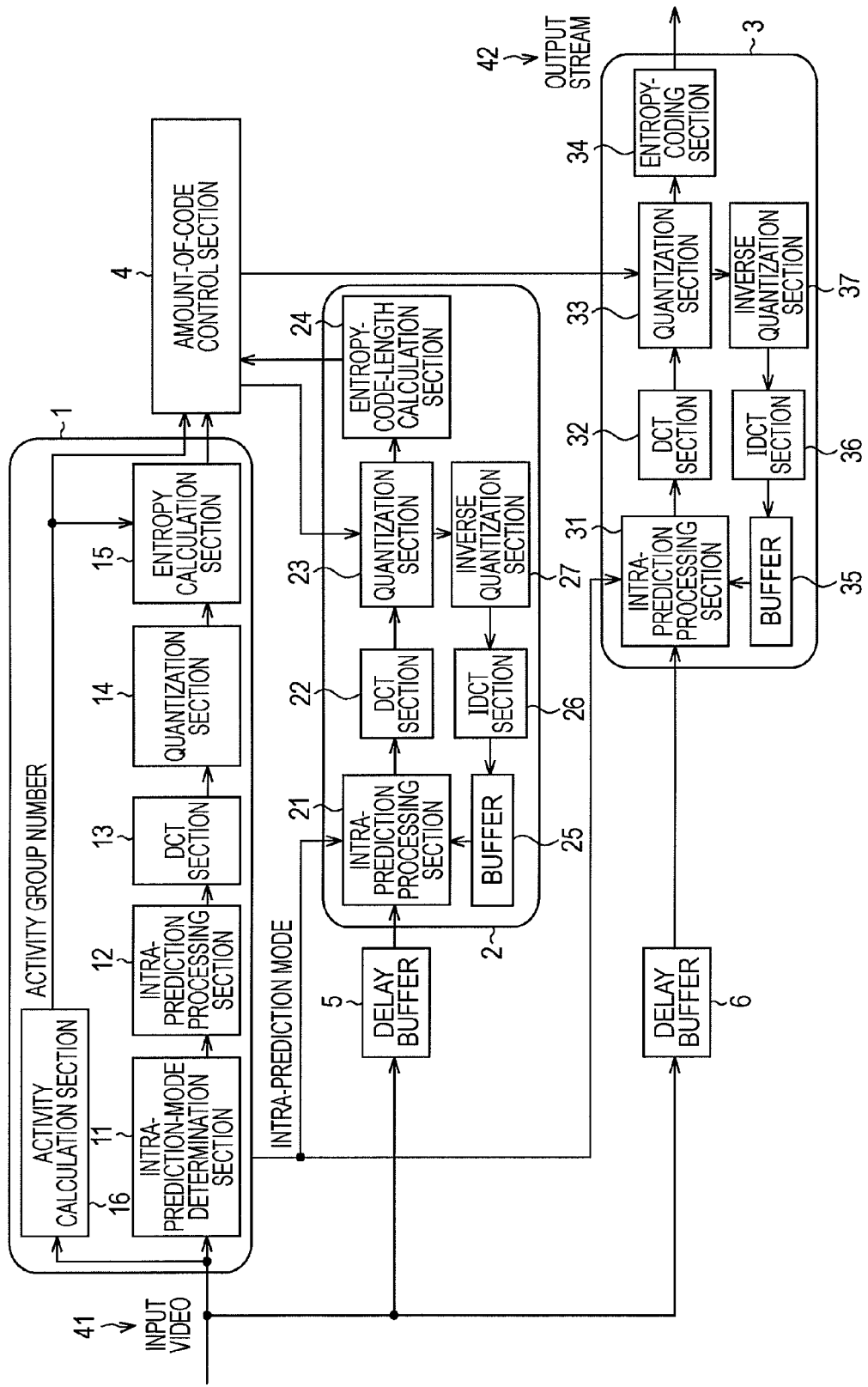
FIG. 1 is a configuration diagram illustrating an image coding apparatus according to a first embodiment of the present invention.

In the following, a detailed description will be given of preferred embodiments of the present invention.

The following are the characteristics of first and second embodiments, described below, of the present invention.

A prediction is made on a quantization parameter achieving the target amount of code. By performing actual encoding using the quantization parameter, the target amount of code and the amount of generated code are matched, making it possible to allocate the amount of code in consideration of the visual characteristics, that is to say, to determine the quantization parameter.

A determination is made on the average quantization parameter in a picture and the quantization matrix at the time of previous coding. If the image is determined to be an image previously coded, the input image is used as input without using the locally decoded image, and thus the detection precision of the back search is improved.

The former is implemented in the first embodiment, and the latter is implemented in the second embodiment. Detailed descriptions will be given in the following.

First Embodiment

In an image coding apparatus and method according to the first embodiment, an image compression coding method using an arithmetic coding, represented by MPEG4 Part10: AVC (Moving Picture Experts Group phase4 Part 10: Advanced Video Coding), etc., is employed, and the following characteristic processing is performed in order to realize satisfactory distribution of the amount of code in a picture at the time of controlling the amount of code.

That is to say, pre-encoding is performed two times to predict the quantization parameter QP for achieving the target amount of code, and actual encoding is performed using the quantization parameter QP. In particular, in the first pre-encoding, the amount of generated code is roughly estimated by the discrete cosine transform (DCT) and the calculation of entropy of the level after the quantization.

The entropy calculation is first carried out using a minimum QP among the quantization parameters QP to be used for quantization, the number of occurrences of each value at that time is counted, the number of occurrences at each quantization parameter QP is obtained from the number of occurrences at the minimum quantization parameter QP, and the entropy for each quantization parameter QP is calculated from the value. The predicted amount of generated code for each quantization parameter QP is obtained from the obtained entropy, and the quantization parameter QP for achieving the target amount of code is obtained. Also, in order to apply the calculation of the entropy to the case of using the quantization matrix Q Matrix, the number of occurrences is counted for each position of DCT block.

Alternatively, in order to enable entropy calculation to support adaptive quantization, macro blocks (MB) are grouped by activity, and the number of occurrences is counted for each group determined by the activity.

As means for changing the quantization matrix Q Matrix adaptively according to a design pattern, the quantization parameter QP for achieving the target amount of code at the time of using a flat quantization matrix Q Matrix (the same as not using Q Matrix) is used, and the quantization matrix Q Matrix is changed by the quantization parameter QP. If the determined quantization matrix Q Matrix is not flat, the quantization parameter QP at the time of using the quantization matrix Q Matrix is obtained again.

In the second encoding, encoding is performed using the quantization parameter QP and the quantization matrix Q Matrix obtained by the first pre-encoding in order to obtain the amount of generated code. The quantization parameter QP is modified by the error between the amount of generated code and the target amount of generated code. In the actual encoding, the quantization parameter QP obtained by the second encoding is used.

In the following, a detailed description will be given of the first embodiment on the basis of such a characteristic.

FIG. 1 illustrates a configuration of an image coding apparatus according to the first embodiment of the present invention.

As shown in FIG. 1, the image coding apparatus includes a first pre-encoding section 1 performing first pre-encoding, a second pre-encoding section 2 performing second pre-encoding, an encoding section 3 performing actual encoding, an amount-of-code control section 4, and delay buffers 5 and 6. The first pre-encoding section 1 includes an intra-prediction-mode determination section 11, an intra-prediction processing section 12, a DCT section 13, a quantization section 14, an entropy calculation section 15, and an activity calculation section 16. The second pre-encoding section 2 includes an intra-prediction processing section 21, a DCT section 22, a quantization section 23, an entropy-code-length calculation section 24, a buffer 25, an IDCT (Inverse DCT) section 26, and an inverse quantization section 27. The encoding section 3 includes an intra-prediction processing section 31, a DCT section 32, a quantization section 33, an entropy-coding section 34, a buffer 35, an IDCT section 36, and an inverse quantization section 37.

In this regard, the first pre-encoding section 1 corresponds to the first coding means, the second pre-encoding section 2 corresponds to the second coding means, and the encoding section 3 corresponds to the third coding means. Also, the activity calculation section 16 corresponds to activity calculation means, for example. However, the present invention is not limited to these relationships as a matter of course.

In such a configuration, input image data 41 is first input into the intra-prediction-mode determination section 11 of the first pre-encoding section 1. The intra-prediction-mode determination section 11 determines an intra-prediction mode on the basis of the input image data 41. The intra-prediction mode determined here is also sent to the second pre-encoding section 2 and the encoding section 3, and is also used for the second encoding by the second pre-encoding section 2 and the actual encoding by the encoding section 3.

Next, the intra-prediction processing section 12 calculates the difference image between the predicted image data and the input image data. Here, in order to simplify the processing, prediction image data is generated from the input image data. The DCT section 13 performs integer-precision DCT, and sends the DCT coefficients to the quantization section 14. The quantization section 14 performs quantization using the DCT coefficients, and sends the output to the entropy calculation section 15. The entropy calculation section 15 calculates the entropy to predict the amount of generated code. As a result of the amount-of-code prediction, a base quantization parameter (Base QP) for a picture and a quantization matrix (Q Matrix), to be used for the next step, are obtained, and are input into the amount-of-code control section 4. To give a supplementary explanation here, the quantization parameter QP is a value for specifying the quantization step in the AVC. The larger the quantization parameter QP is, the larger the quantization step becomes.

At the same time with the determination of the intra-prediction mode, the activity calculation section 16 calculates activity in the first pre-encoding section 1, and groups macro blocks (MBs) according to the activity. The activity group number determined for each macro block (MB) is input into the entropy calculation section 15 and the amount-of-code control section 4.

The amount-of-code control section 4 sends the quantization information (the quantization matrix Q Matrix, the quantization parameter QP of each MB) to the second pre-encoding section 2 to be subjected to the second pre-encoding from the base quantization parameter Base QP for a picture, the quantization matrix Q Matrix, and an activity group of each macro block MB, which have been obtained by the first pre-encoding of the first pre-encoding section 1.

That is to say, the input image data is input through the delay buffer 5 after the delay processing. The intra-prediction processing section 21 calculates the difference between the predicted image data and the input image data. The difference is subjected to DCT by the DCT section 22, and is subjected to quantization by the quantization section 23. Then the entropy-code-length calculation section 24 calculates the amount of generated code. In this regard, the output of the quantization section 23 is subjected to inverse quantization by the inverse quantization section 27 to reproduce the coefficient data, the coefficient data is subjected to IDCT by the IDCT section 26, and the image data related to the input image is reproduced to be saved in the buffer 25.

The amount of generated code is obtained after the second pre-encoding section 2 has completed the second pre-encoding. The amount-of-code control section 4 corrects the base quantization parameter Base QP from the obtained amount of generated code.

The third encoding section 3 performs actual encoding using the base quantization parameter Base QP of a picture, which has been determined by the second pre-encoding by the second pre-encoding section 2, and the quantization matrix Q Matrix and the activity group, which have been determined by the first pre-encoding.

That is to say, when the intra-prediction processing section 31 receives the input image data having been subjected to the delay processing through the delay buffer 6, the intra-prediction processing section 31 calculates the difference image between the predicted image and the input image in the mode determined at the time of the first pre-encoding. The difference image is subjected to DCT by the DCT section 32, and is subjected to quantization by the quantization section 33. Then, the entropy-code-length calculation section 34 performs entropy coding, and outputs an output stream 42. In this regard, the output of the quantization section 33 is subjected to inverse quantization by the inverse quantization section 37 to reproduce the coefficient data, the coefficient data is subjected to IDCT by the IDCT section 36, and the image data related to the input image is reproduced to be saved in the buffer 35.

In the following, a description will be given in further detail of a series of processing related to the coding by an image coding apparatus according to the first embodiment of the present invention with reference to a flowchart in FIG. 2.

First, the activity calculation section 16 calculates activity for each MB on the basis of the input image data, and divides the MBs into activity groups depending on the values thereof (step S1).

That is to say, for example, if it is assumed that the MBs are divided into NumOfActivityGroup groups, the activity calculation section 16 compares the activity with ActivityTheshold[0] to ActivityTheshold[NumOfActivityGroup−2] to determine a group. The quantization parameter QP for each MB can be obtained by adding an offset AdaptQpDelta, which is dependent on an activity group, to a base quantization parameter Base QP for a picture.

MB_QP=BaseQp+AdaptQpDelta[activity_group]

For example, if the activity group NumOfActivityGroup is assumed to be 13, each value of the offset AdaptQpDelta, which is dependent on this, can be determined to be as follows.

AdaptQpDelta[13]={−6, −5, −4, −3, −2, −1, 0, 1, 2, 3, 4, 5, 6}

Next, the intra-prediction-mode determination section 11 determines the intra-prediction mode (step S2), and the processing proceeds to the first pre-encoding processing (step S3).

The purpose of the first pre-encoding processing is to roughly estimate the amount of generated code by calculating the entropy of the data after the DCT and the quantization. In an image compression coding method using an arithmetic coding, compression efficiency close to the entropy, which is a theoretical compression limit, is obtained. By taking advantage of this fact, the amount of code is predicted using the entropy.

That is to say, the value after having been subjected to the intra-prediction processing by the intra-prediction processing section 12 and the DCT by the DCT section 13 is quantized by a minimum quantization parameter QP, and the number of occurrences of the absolute value of each value of the quantization coefficients is counted. That is to say, if the absolute value of the quantization coefficients to occur are 0 to MaxLevel_In_MinQ, Count[0] to Count[MaxLevel_In_MinQ] are obtained.

Here, the minimum quantization parameter QP is a minimum value of the quantization parameters QP scheduled to be used. For example, if it is found in advance that a small quantization parameter QP is not used because of low bit rate, the portion excluding this part should be considered.

If the quantization parameter QP used here becomes large, MaxLevel_In_MinQ becomes small, and thus the number of counters can be reduced. However, the amount of code when a quantization parameter QP, which is smaller than this quantization parameter QP, is difficult to be obtained, because the information is lost. In this regard, the number of occurrences after quantization is obtained. This is for the purpose of reducing the number of counters. If there is no limit of the number of counters, the values before the quantization, that is to say, the number of occurrences of the DCT coefficients may be obtained. The number of occurrences is obtained for all the parts of one picture.

Next, the amount-of-code control section 4 performs amount-of-code prediction processing, which obtains the prediction value of the amount of generated code for each quantization parameter QP (step S4). This is processing for each quantization parameter.

Figure 3:
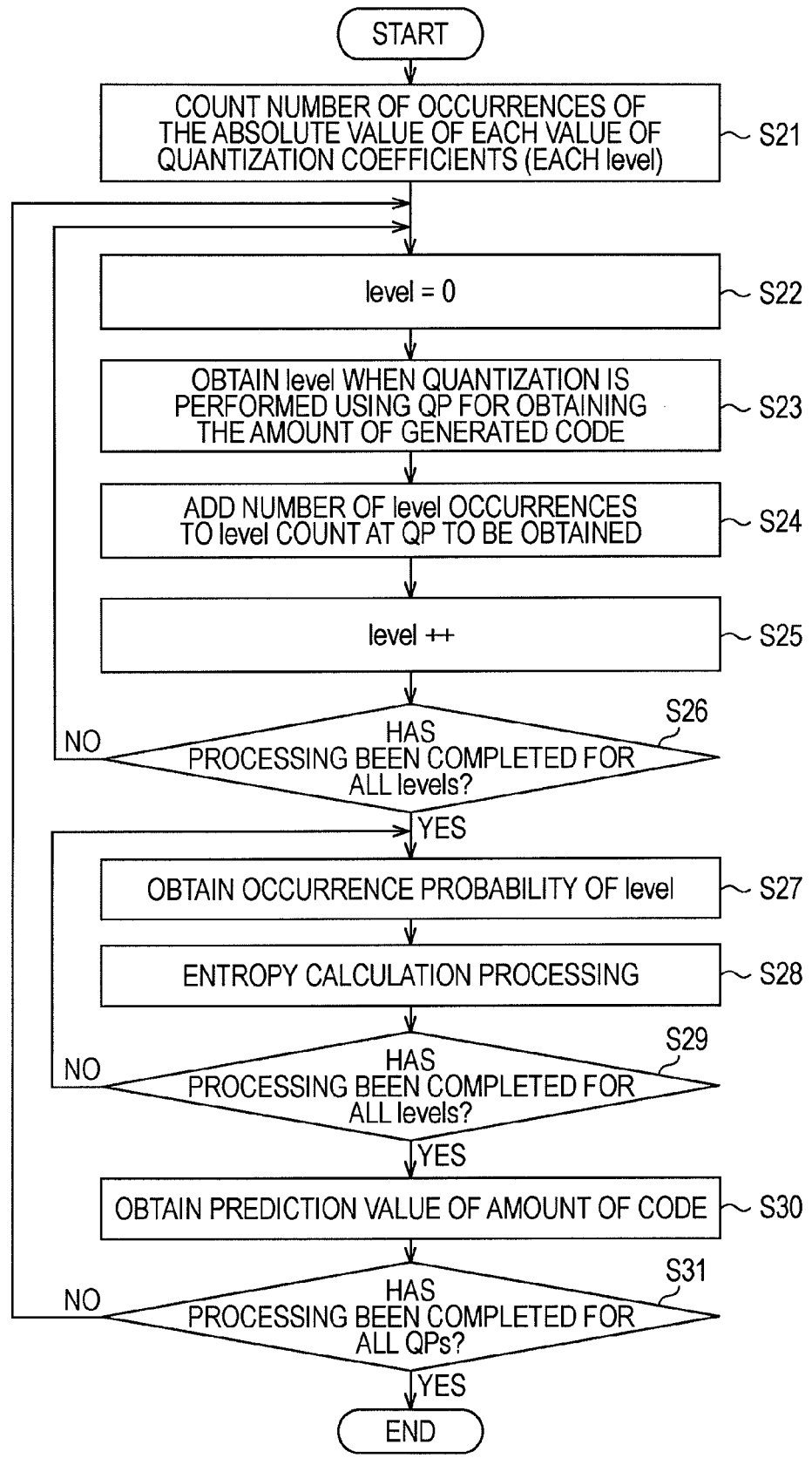
FIG. 3 is a detailed flowchart illustrating amount-of-code prediction processing.

The details of the amount-of-code prediction processing by the entropy calculation section 15 are shown by a flowchart in FIG. 3. That is to say, the number of occurrences of the absolute value of each value of the quantization coefficients is counted (for each level) (step S21). A variable level is initialized (level=0) (step S22) The level is obtained when quantization is performed using QP for obtaining the amount of generated code (step S23). Next, the number of level occurrences is added to the level count at the quantization parameter QP from which the amount of generated code is obtained (step S24). The variable level is incremented (step S25). A determination is made on whether all the levels have been processed (step S26).

If determined that all the levels have not been processed (branches to No at step S26), the processing returns to step S22, and the above-described processing is repeated. If determined that all the levels have been processed (branches to Yes at step S26), the processing proceeds to step S27.

That is to say, from step S21 to step S26, the number of occurrences of the absolute value of each value of the quantization coefficients is obtained from the number of occurrences of the absolute value of each value of the quantization coefficients at a minimum quantization parameter QP.

Next, the occurrence probability of the level is obtained (step S27), and the entropy is obtained from the number of occurrences obtained before (step S28).

Now, the occurrence probability P[i] of the absolute value of each value of the quantization coefficients is obtained by the following expression.

$$P[i] = count[i]/total\_count$$

Using the occurrence probability P[i], the entropy is obtained by the following expression.

$$Entropy = -1 * \Sigma i (P[i] * log(P[i])/log(2))  \quad [Expression\ 1]$$

A determination is made on whether processing of steps S27 and S28 has been performed for all the levels (step S29). If not, the processing is repeated for all the levels. If the processing has been completed for all the levels (branches to Yes at step S29), the estimated value Estimated_Bits of the amount of code is obtained by the following expression (step S30).

$$Estimated\_Bits = Entropy * total\_count + sin\_bits$$

Here, the code bits sign_bits becomes sing_bits=non_zero_count assuming that the number of occurrences of non-zero coefficient is non_zero_count.

Figure 4:
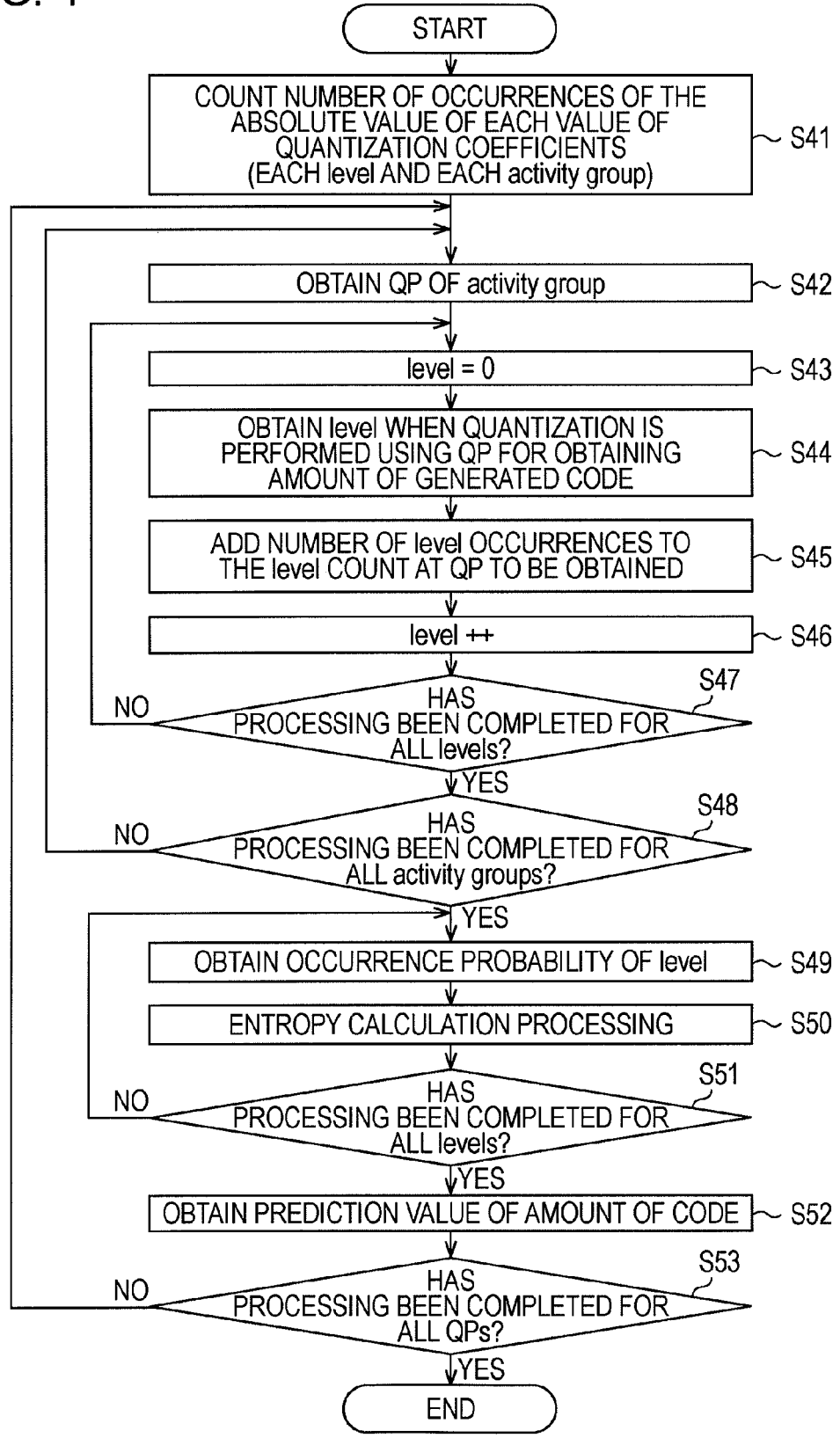
FIG. 4 is a detailed flowchart illustrating amount-of-code prediction processing supporting activity.

Here, in order to support activity, it is necessary to replace the basic processing in FIG. 3 with the processing shown by a flowchart in FIG. 4.

First, at the time of counting the number of occurrences of the absolute value of each value of the quantization coefficients is counted, counting is carried out for each activity group in addition to for each level (step S41).

That is to say, the count value Count[each_activity_group] [each_level] is counted.

Next, processing is performed for obtaining the prediction value of the amount of generated code for each base quantization parameter Base QP of a picture. This processing is performed for each quantization parameter QP. First, the quantization parameter QP for each activity group is obtained (step S42). Next, the variable level is initialized (level=0) (step S43), and then the level is obtained when quantization is performed using QP for obtaining the amount of generated code (step S44). The number of level occurrences is added to the level count at the quantization parameter QP to be obtained (step S45). The variable level is incremented (step S46). A determination is made on whether processing has been completed for all levels (step S47). If determined that all the levels have not been processed (branches to No at step S47), the processing returns to step S43, and the above-described processing is repeated. If determined that all the levels have been processed (branches to Yes at step S47), the processing proceeds to step S48.

In the above-described steps, for each activity group, the number of occurrences of the absolute value of each value of the quantization coefficients at the time of the quantization parameter QP for obtaining the amount of generated code is obtained from the number of occurrences of the absolute value of each value of the quantization coefficients at a minimum quantization parameter QP.

In step S48, a determination is made on whether processing has been completed for all activity groups. If determined that all the activity groups have not been processed (branches to No at step S48), the processing returns to step S42, and the above-described processing is repeated. If determined that the processing for all the activity groups has been completed (branches to Yes at step S48), the entropy is obtained from the obtained number of occurrences, and the prediction value of the amount of generated code is obtained (steps S49 to S53).

The processing from steps S49 to S53 is the same as the processing from steps S27 to S31 in FIG. 3, and thus the duplicated description will be omitted.

Figure 5:
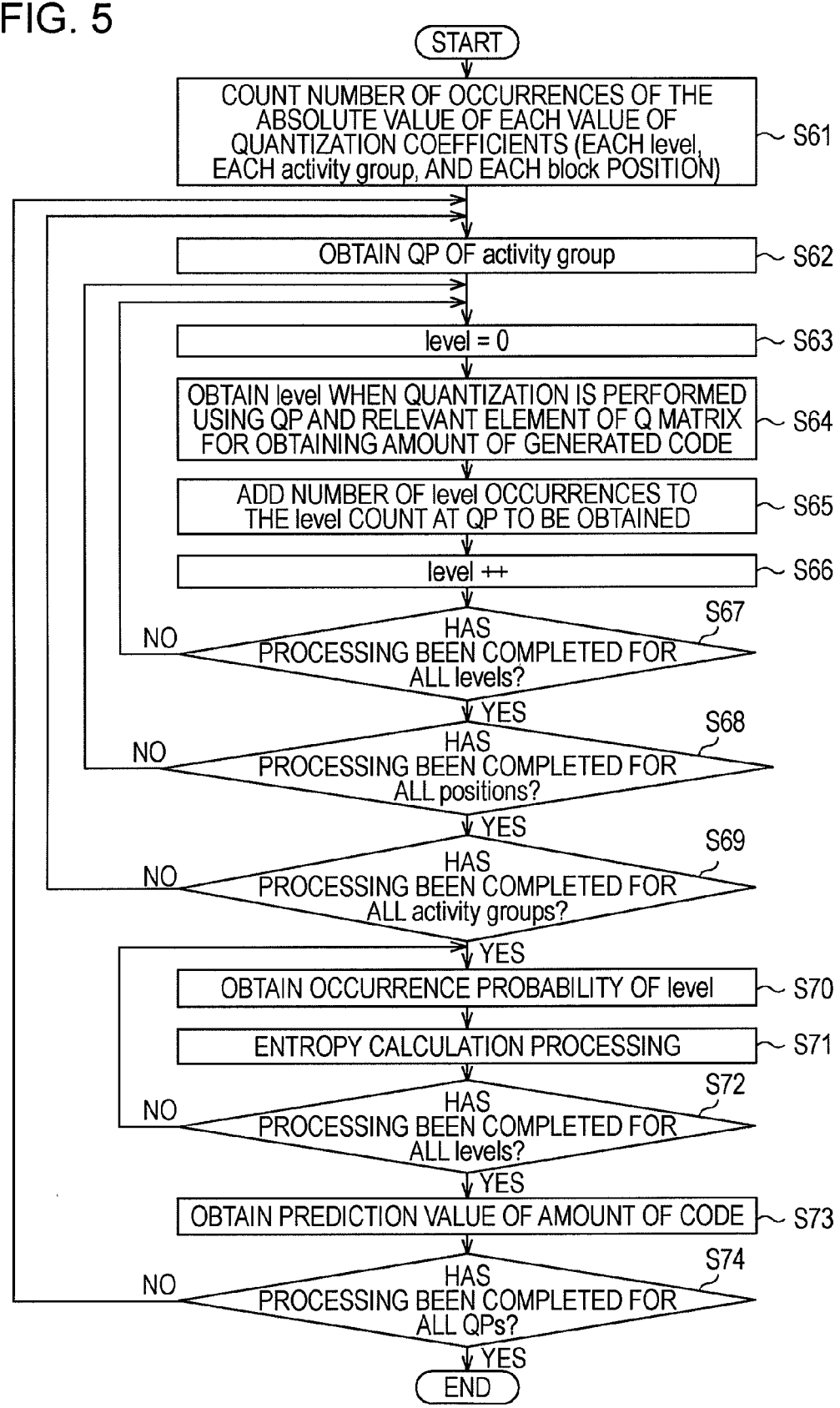
FIG. 5 is a detailed flowchart illustrating amount-of-code prediction processing supporting a quantization matrix.

Also, in order to support quantization matrix Q Matrix further, it is necessary to replace the basic processing in FIG. 3 with the processing shown by the flowchart in FIG. 5.

First, at the time of counting the number of occurrences of the absolute value of each value of the quantization coefficients, counting is carried out for each position in a DCT block in addition to for each level and for each activity group (step S61).

That is to say, the count value Count[each_activity_group] [each_position][each_level] is counted.

Next, processing is performed for obtaining the prediction value of the amount of generated code for each base quantization parameter Base QP of a picture. This processing is performed for each quantization parameter QP. The processing to be added here is that each element of the quantization matrix Q Matrix is calculated in consideration of each position in a DCT block when the quantization parameter QP for obtaining the amount of generated code is obtained at the time of quantization using a minimum quantization parameter QP (step S64). That is to say, the coefficients after the DCT means the quantization by the product of the quantization parameter QP and the quantization matrix Q Matrix. Next, for each position in a DCT block, the number of occurrences of the absolute value of each value of the quantization coefficients at the time of the quantization parameter QP for obtaining the amount of generated code is obtained from the number of occurrences of the absolute value of each value of the quantization coefficients at a minimum quantization parameter QP (step S65).

These steps of processing is repeated for all the levels (steps S63 to S67). Further, the processing is repeated for all the positions in a DCT block (steps S63 to S68). The processing subsequent to these steps (steps S69 to S74) is the same as the processing from step S48 to S53 in FIG. 4, and thus the duplicated description will be omitted.

Figure 2:
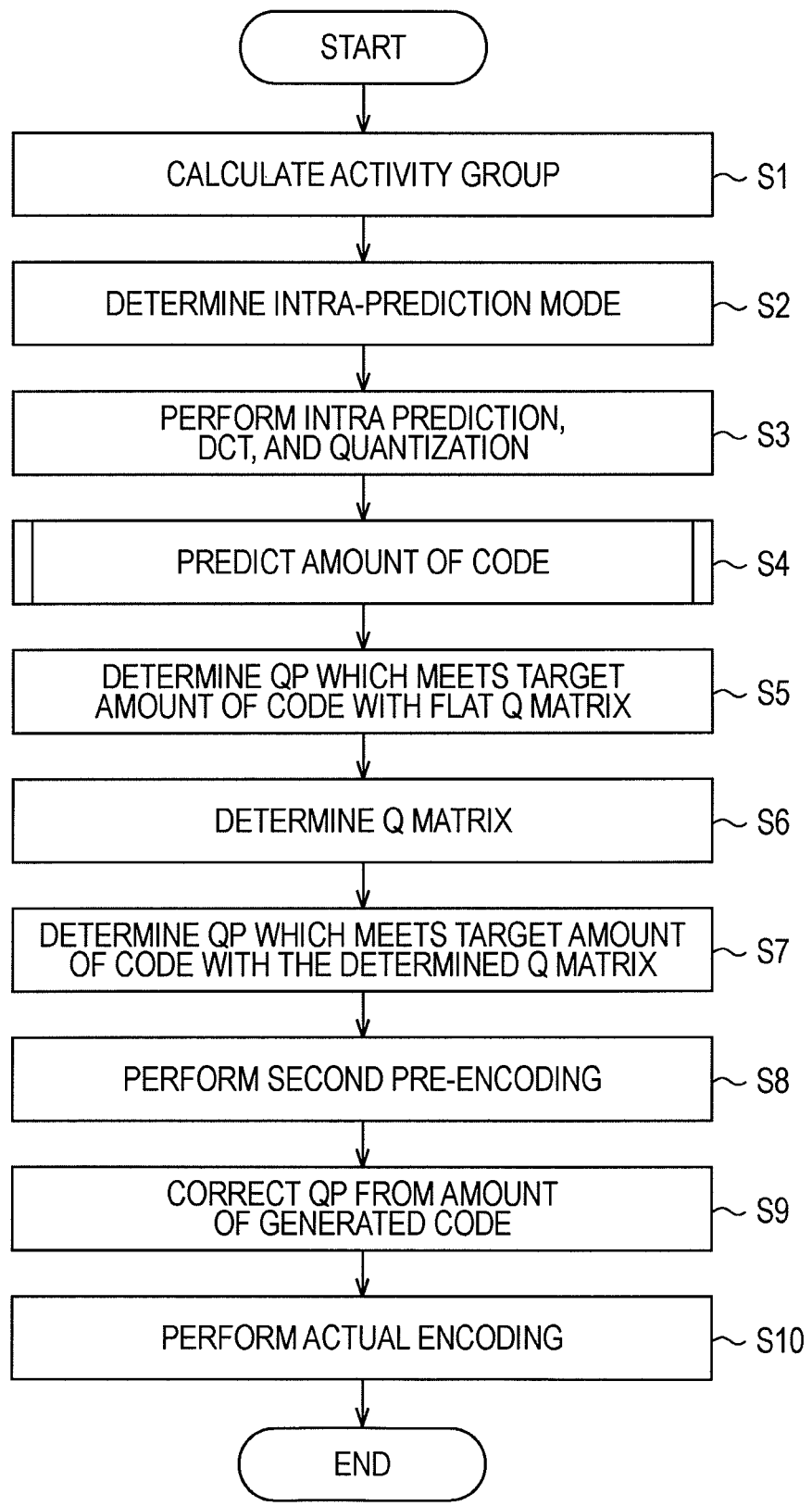
FIG. 2 is a flowchart illustrating, in further detail, a series of processing on coding by the image coding apparatus according to the first embodiment of the present invention.

Now, referring back to the description in FIG. 2, the processing proceeds to quantization-parameter determination processing next. That is to say, the predicted amount of code for the quantization parameter QP has been obtained by the above-described processing, and thus a quantization parameter QP having a nearest value to the target amount of code is selected among them (step S5).

In this regard, if change processing of an adaptive quantization matrix Q Matrix is performed, the processing of step S5 should be changed as follows. That is to say, in that case, the predicted amount of code for the quantization parameter QP using a flat quantization matrix Q Matrix (the same as not using Q Matrix) is obtained. Then, a quantization parameter QP having the nearest to the target amount of code is selected.

A quantization matrix Q Matrix to be used is selected from the obtained value of the quantization parameter QP (step S6). More specifically, assuming that the number of types to be changed for use is NumOfQMatixId, a quantization matrix Q Matrix is determined by comparing QMatrixTheshold[0] to QMatrixTheshold[NumOfQMatixId−2] with the quantization matrix Q Matrix. Then, the predicted amount of code for the quantization parameter QP at the time of using the quantization matrix Q Matrix to be used is obtained. A quantization parameter QP having a nearest value to the target amount of code is selected among them (step S7). This is the base quantization parameter Base QP of the picture, which has been determined by the first pre-encoding section 1.

Next, the second pre-encoding section performs the second pre-encoding using the base quantization parameter Base QP for the picture, the quantization matrix Q Matrix, and the activity group, which have been determined by the first pre-encoding of the first pre-encoding section 1 (step S8). The purpose of the second pre-encoding is to actually perform encoding using the quantization parameter QP roughly estimated by the first pre-encoding to obtain a prediction error, and to correct the error. After the encoding is completed, the amount of generated code is obtained.

Next, the quantization parameter QP is corrected by the difference between the amount of generated code obtained by the second pre-coding of the second pre-encoding section 2 and the target amount of code (step S9). That is to say, the quantization parameter QP is corrected on the assumption that the amount of generated code changes by DiffRatio each time the quantization parameter QP changes by 1. The amount of correction is small, and thus the error is assumed to be at a level of substantially no problem even if the change of the quantization parameter QP against the amount of generated code is regarded as a constant value regardless of a design pattern.

Figure 6:
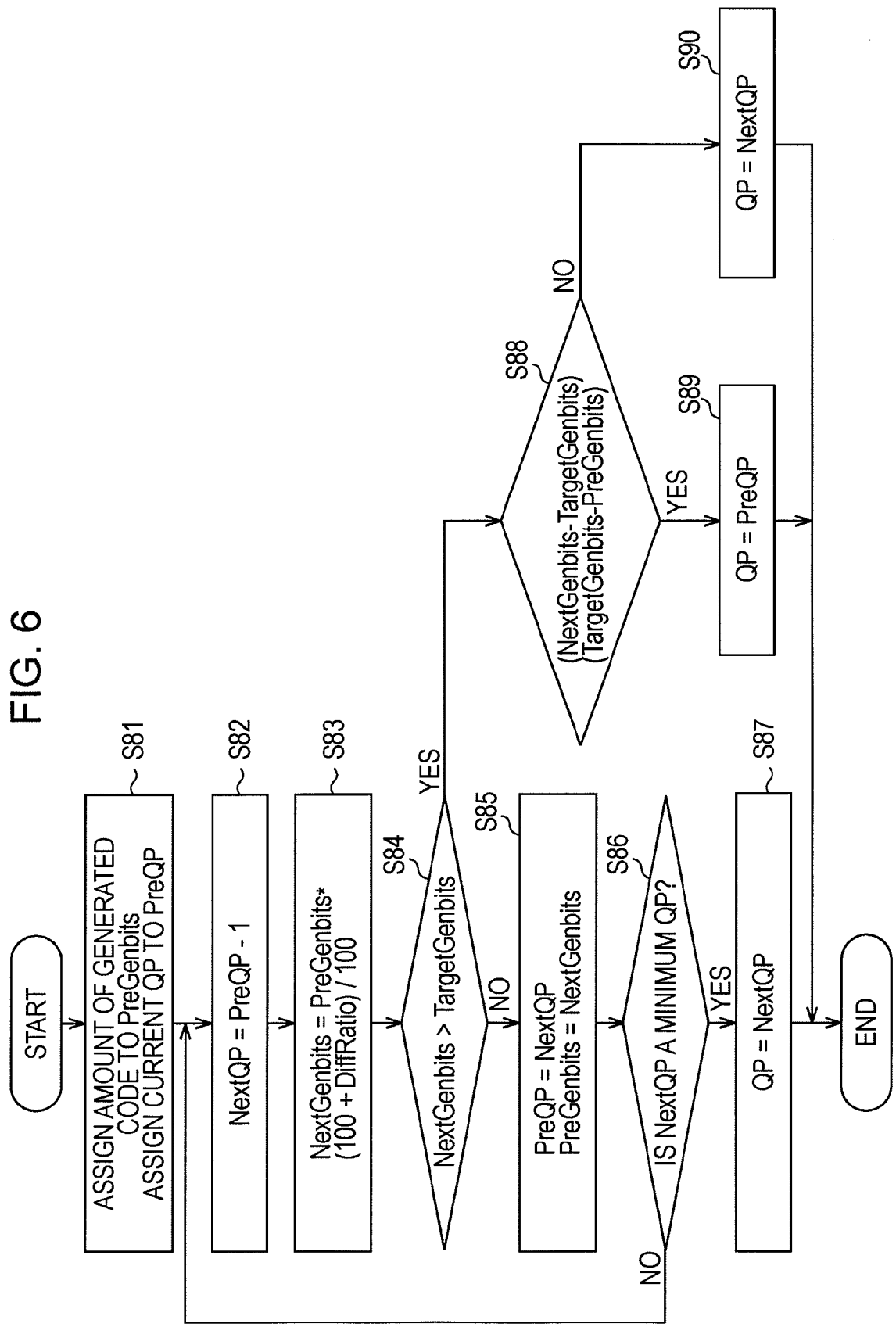
FIG. 6 is a flowchart illustrating amount-of-code correction processing when amount of generated code is smaller than a target amount of code, and a quantization parameter QP is not a minimum value.

Here, a description will be given of amount-of-code correction processing when the amount of generated code is smaller than the target amount of code, and the quantization parameter QP is not a minimum value with reference to the flowchart in FIG. 6.

In this regard, the processing is basically the same in the case where the amount of generated code is smaller than the target amount of code.

Now, in this processing, the amount of generated code is assigned to PreGenbits, and the current quantization parameter QP is assigned to PreQP (step S81). Next, the value of PreQP decreased by 1 is assigned to NextQP (step S82), and PreGenbits*(100+DiffRatio)/100 is assigned to the amount of generated code NextGenbits corresponding to NextQP (step S83). Here, it is assumed that each time the quantization parameter QP is decreased by 1, the amount of generated code is decreased by DiffRatio.

Next, a determination is made on whether the amount of generated code NextGenbits is larger than the target amount of code TargetGenbit (step S84). Here, if not NetGenBits>TargetGenbit, NextQP is returned to PreQP, and NextGenBits is returned to PreGenbits (step S85), and a determination is made on whether NextQP is a minimum quantization parameter QP (step S86).

Here, if NextQP is not a minimum quantization parameter QP, the processing returns to step S82, and the above-described processing is repeated. On the other hand, if NextQP is a minimum quantization parameter QP, NextQP is assigned to the quantization parameter QP, and the processing is terminated. At the same time, if NetGenBits>TargetGenbit, a determination is made on whether (NextGenbits−TargetGenbit)>(TargetGenBit−PreGenBits) (step S88). If this relationship holds, PreQP is assigned to QP. If this relationship does not hold, NextQP is assigned to QP, and the processing is terminated.

Referring back to FIG. 2 again, the third encoding section 3 performs actual encoding (step S10). The actual encoding is performed using the base quantization parameter Base QP for a picture, which has been determined by the second pre-encoding of the second pre-encoding section 2, the quantization matrix Q Matrix, and an activity group, which have been determined by the first pre-encoding. In this manner, a series of processing related to image-information coding is terminated.

As described above, by the first embodiment of the present invention, it becomes possible to match an amount of generated code with a target amount of code given to one picture without performing intra-frame feedback control. Thus, it becomes possible to eliminate problems with the feedback control, such as negative effects by an inappropriate initial value of the feedback parameter and improper allocation of target amount of code, etc. As a result, it becomes possible to match the amount of generated code with the target amount of code, and to allocate the amount of code in consideration of visual characteristics, that is to say, to determine the quantization parameter.

Second Embodiment

Next, a description will be given of a second embodiment of the present invention.

An image coding apparatus according to the second embodiment employs an image compression coding system using orthogonal coordinate transformation, such as DCT, etc., represented by MPEG4 AVC, and has the characteristics as shown below in order to detect a discrete distribution state from the coefficient distribution after the DCT.

That is to say, in the second embodiment, a determination is made on the average quantization parameter QP in the picture and the quantization matrix Q Matrix at the time of previous coding. If the image is determined to be an image previously coded, the input image is used as input without using the locally decoded image, and thus the detection precision of the back search is improved. The state in which the average quantization parameter QP and the quantization matrix Q Matrix are not found is regarded as the original image not coded previously. A determination is made on whether the original image or the previously coded image. Furthermore, when the image is regarded as the original image, if the prediction value of the average quantization parameter QP in the picture is too large, a determination condition is used for improving the subjective image quality using an input-stage lowpass filter. If determined that the image is an previously coded image, the quantization matrix Q Matrix and the quantization parameter QP are set in the back-search section, and the search range of the back-search processing is limited in order to reduce the circuit size. In addition to the above, when the signal having been subjected to Long GOP coding is input, it is also used for the determination of an intra picture.

In the following, a detailed description will be given of the second embodiment on the basis of these characteristics.

Figure 7:
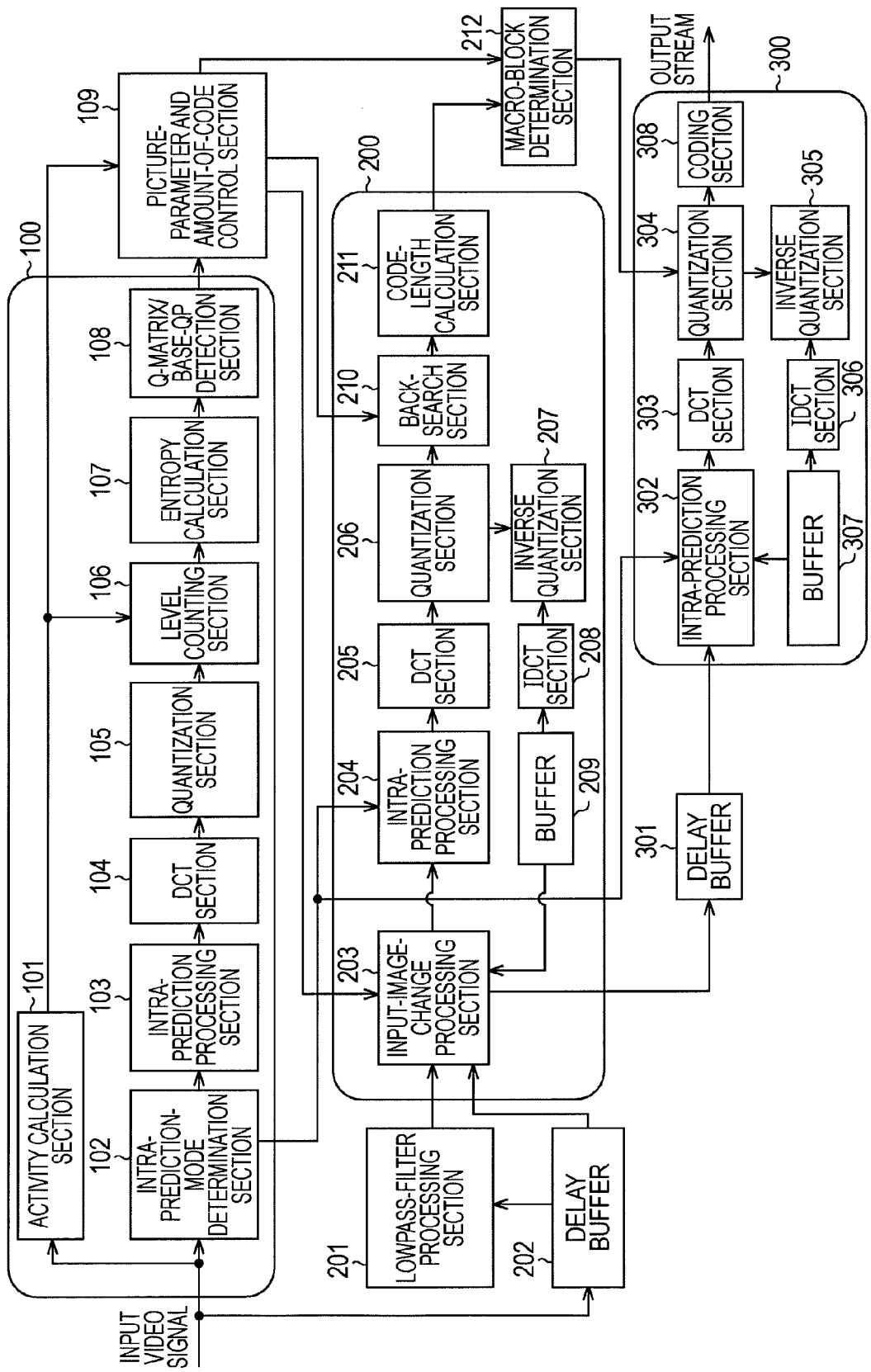
FIG. 7 is a configuration diagram of an image coding apparatus according to a second embodiment of the present invention.

FIG. 7 illustrates a configuration of an image coding apparatus according to the second embodiment of the present invention. As shown in FIG. 7, the image coding apparatus includes a first pre-encoding section 100 performing first pre-encoding, a second pre-encoding section 200 performing second pre-encoding, an encoding section 300 performing actual encoding, an amount-of-code control section 109, a lowpass-filter processing section 201, a delay buffer 202, and a macro-block determination section 212.

More specifically, the first pre-encoding section 100 further includes an activity determination section 101, an intra-prediction-mode determination section 102, an intra-prediction processing section 103, a DCT section 104, a quantization section 105, a level counting section 106, an entropy calculation section 107, and a Q Matrix/Base QP detection section 108. The second pre-encoding section 200 includes an input-image change processing section 203, an intra-prediction processing section 204, a DCT section 205, a quantization section 206, an inverse quantization section 207, an IDCT section 208, a buffer 209, a back-search section 210, and an code-length calculation section 211. The encoding section 300 includes an intra-prediction processing section 302, a DCT section 303, a quantization section 304, an inverse quantization section 305, an IDCT section 306, a buffer 307, and a coding section 308.

With such a configuration, input image data is first input into the intra-prediction-mode determination section 102, and the intra-prediction-mode is determined. The mode determined here is also used in the second pre-encoding section 200 and the encoding section 300.

Next, the intra-prediction processing section 103 calculates the difference between the predicted image data and the input image data. The prediction image data is created from the input image data. Using the input image data for the prediction image data, it is possible to improve the detection rate of the quantization matrix Q Matrix and base quantization parameter Base QP by the Q Matrix/Base QP detection section 108, and to reduce the inverse quantization and IDCT sections included in the second pre-encoding section 200.

Next, the DCT section 104 performs discrete cosine transform, etc., and the quantization section 105 performs quantization. The output thereof is input to the entropy calculation section 107 through the level counting section 106 to calculate the entropy, thereby predicting the amount of code for all the quantization parameters QP. The target value in the vicinity of the quantization parameters QP and the level counting result of the level counting section 106 are input into the Q-matrix/Base-QP detection section 108. The Q-matrix/Base-QP detection section 108 detects whether the input is related to an original image that has not been subjected to coding previous time. At the same time, the Q-matrix/Base-QP detection section 108 determines the quantization matrix Q Matrix and the base quantization parameter Base QP.

At the same time, the input image is also input into the activity determination section 101 to calculate activities. The macro blocks MB are grouped by the activities. The activity group number determined for each MB is input into the level counting section 106 and the picture-parameter and amount-of-code control section 109.

When the Q-matrix/Base-QP detection section 108 detects that the input is an original image, the picture-parameter and amount-of-code control section 109 pass the quantization information (the quantization matrix Q Matrix, the quantization parameter QB of each MB) to the second pre-encoding section 200 to perform encoding from the Base QP for the picture, the quantization matrix Q Matrix, activity group of each MB, which have been determined by the first pre-encoding section 100. After the encoding, the picture-parameter and amount-of-code control section 109 obtains the amount of generated code. The picture-parameter and amount-of-code control section 109 correct the base quantization parameter Base QP of the picture from the obtained amount of generated code.

Also, when the base quantization parameter Base QP of the picture becomes too large to make the distortion conspicuous, the input-image change processing section 203 uses the lowpass-filter processing section 201 in order to reduce visual distortion, and bypasses the back-search section 210.

When the Q-matrix/Base-QP detection section 108 detects the quantization matrix Q Matrix and the base quantization parameter Base QP, the second pre-encoding section 200 improves the detection efficiency in the back-search processing of the back-search section 210 in the input-image change processing section 203 using the input image from the delay buffer 202 without using the locally decoded image from the buffer 209.

When back search is working, the second pre-encoding section 200 determines the quantization parameter QP which produces a minimum distortion for each macro block, and determines whether to use the back-search result in the range of the macro-block determination section 212 enabling control of the amount of code.

The encoding section 300 performs parameter encoding using the intra-prediction mode obtained by the first pre-encoding section 100, the quantization matrix Q Matrix and the base quantization parameter Base QP determined by the amount-of-code control section 109, and the offset of the quantization parameter QP of the macro block MB, which has been obtained by the macro-block determination section 212.

Figure 8:
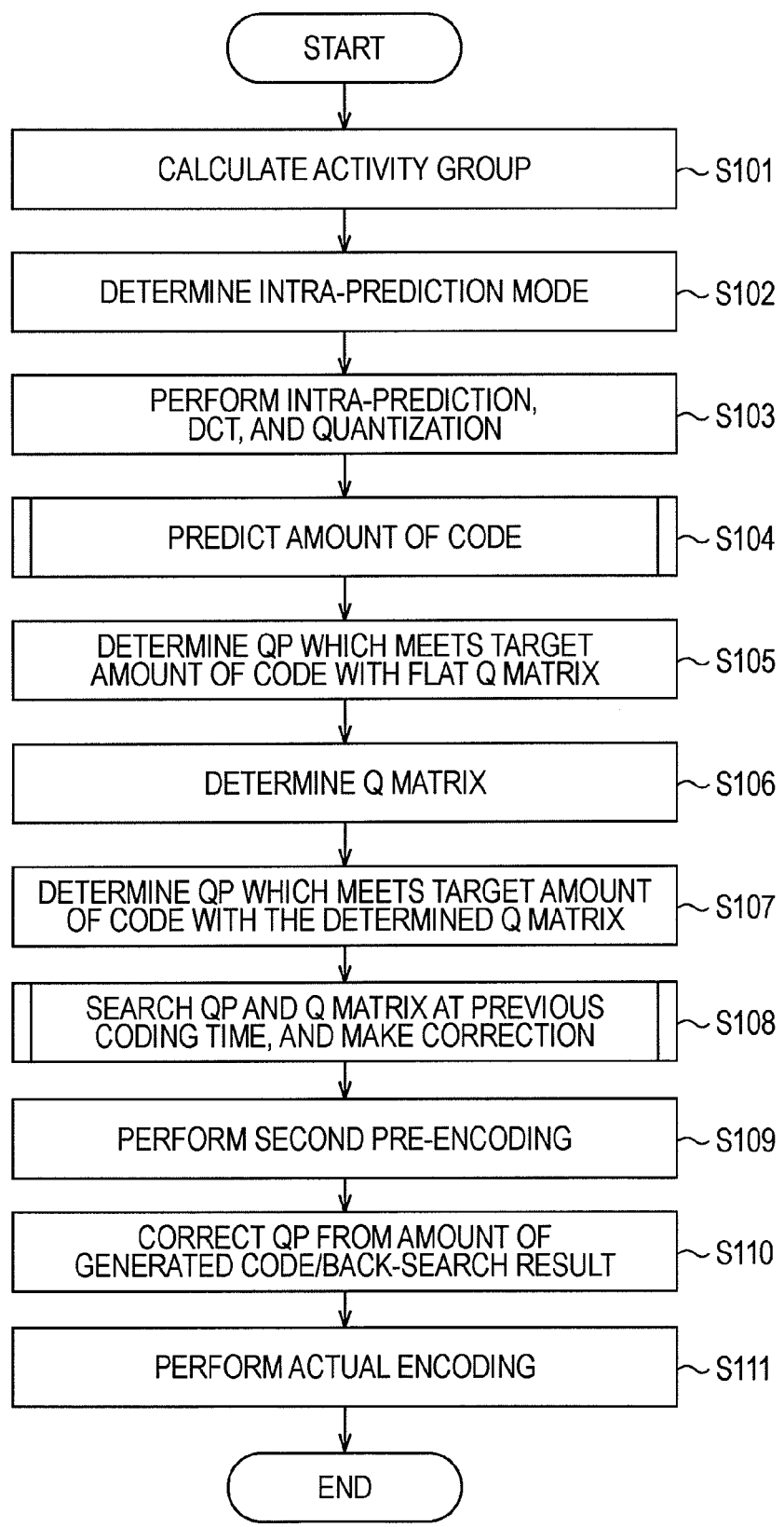
FIG. 8 is a flowchart illustrating, in further detail, a series of processing on coding by the image coding apparatus according to the second embodiment of the present invention.

In the following, a description will be given in further detail of a series of processing related to the coding by an image coding apparatus according to the second embodiment of the present invention with reference to a flowchart in FIG. 8.

Here, a description will be given mainly of the different points from the first embodiment (FIG. 2).

In steps S101 to S107, the processing is the same as the processing of the steps S1 to S7 in FIG. 2. However, in step S108, a search is made on the quantization parameters QP and the quantization matrix Q Matrix at the time of previous coding to perform correction (step S108).

Here, the distribution data of the count value Count[each_activity_group][each_position][each_level], which is the number of occurrences of the absolute value of each value of the quantization coefficients is used as basic information of the processing.

Figure 12:
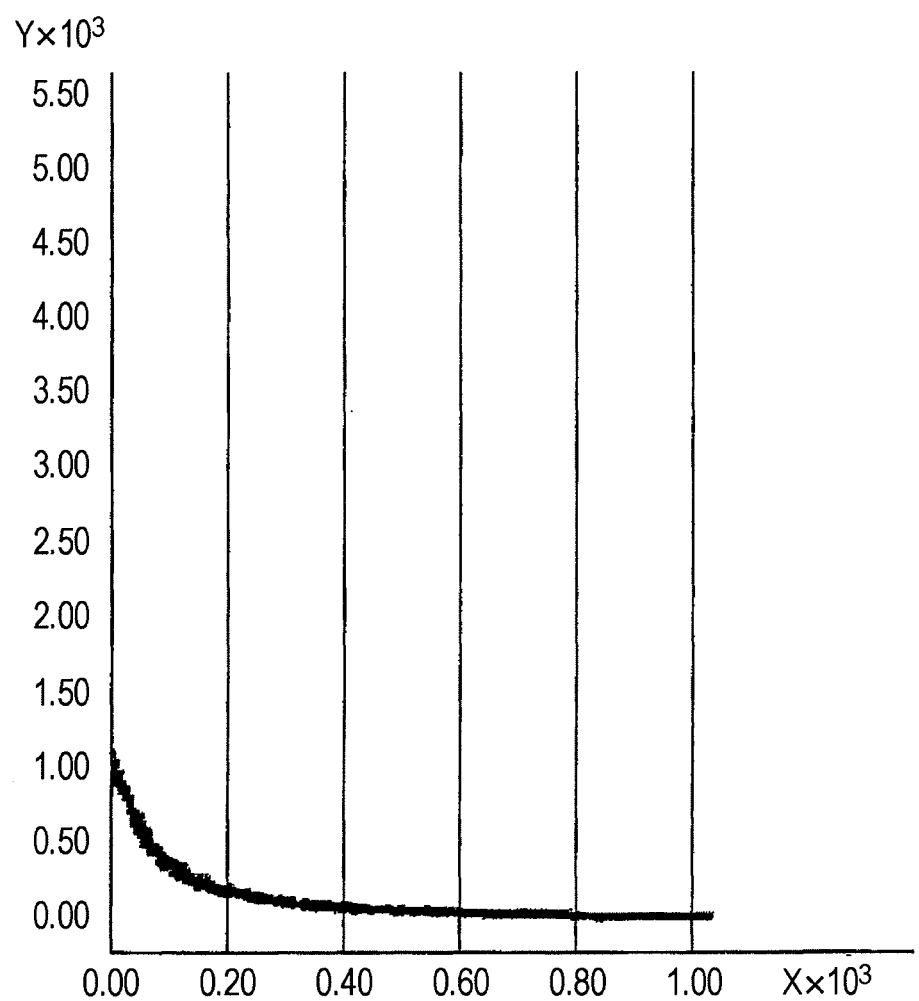
FIG. 12 is a diagram illustrating distribution-state measurement values when each_activity_group=0 and each_position=5 in the case of inputting an original image.
Figure 13:
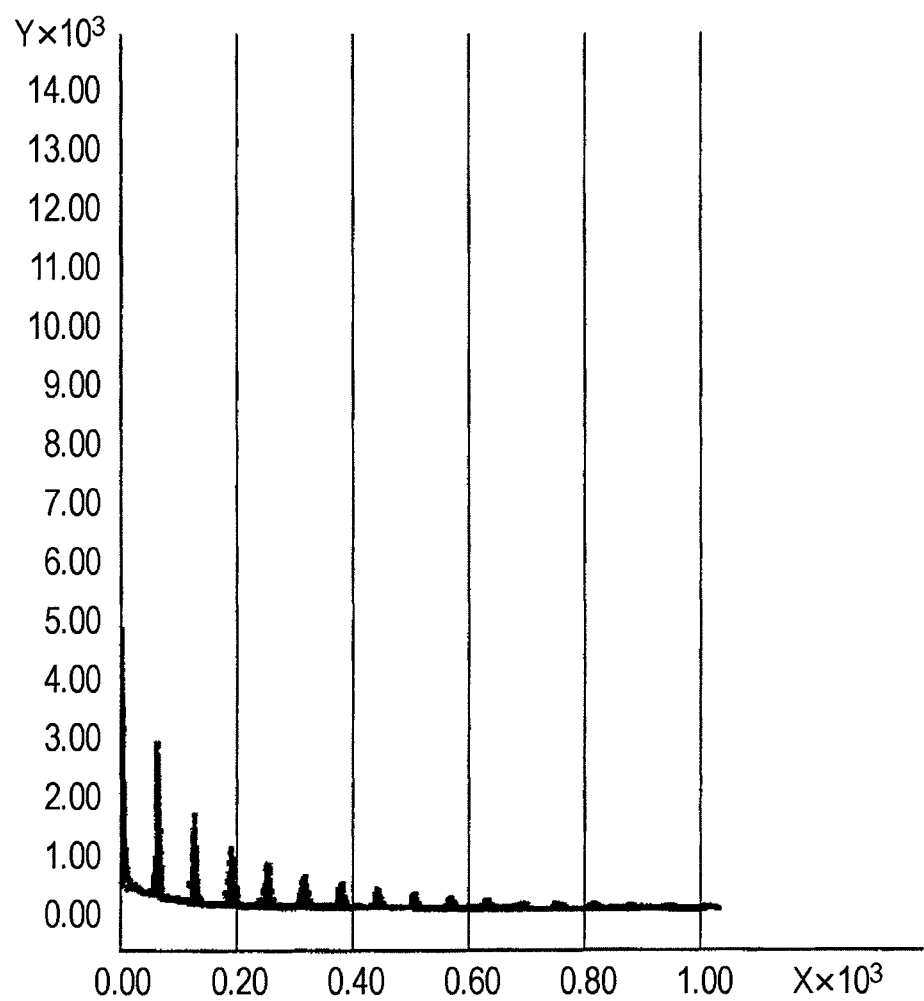
FIG. 13 is a diagram illustrating distribution-state measurement values when each_activity_group=0 and each_position=5 in the case of inputting an image coded by QP=20 at previous time.

FIG. 12 shows actual measurement values of the distribution state in the case of inputting the original image when each_activity_group=0, and each_position=5. FIG. 13 shows actual measurement values of the distribution state in the case of inputting the image coded by QP=20 at previous time when each_activity_group=0, and each_position=5. Each horizontal axis indicates the quantization parameter QP and each vertical axis indicates the count value of the number of occurrences of each value of the quantization coefficients.

In general, in the coding method of H.264 AVC, the discrete state by quantization becomes widespread by non-linear causes, such as insufficient calculation precision of IDCT, not reproduced 100% of the intra-prediction mode, etc. However, it is possible to detect the discrete state. The data for one frame is too sufficient information statistically. Thus, in this embodiment, in order to reduce the amount of calculation, the quantization parameter QP and the quantization matrix Q Matrix, by which distribution in the vicinity of the quantization parameter QP, that is to say, the count level after quantization is 1 and has a minimum surplus, is obtained. In this regard, it is necessary to exclude the distribution data showing the adjacent quantization level, and thus the data in the range QP/2 to 3QP/2 is used as the evaluation target.

Figure 9:
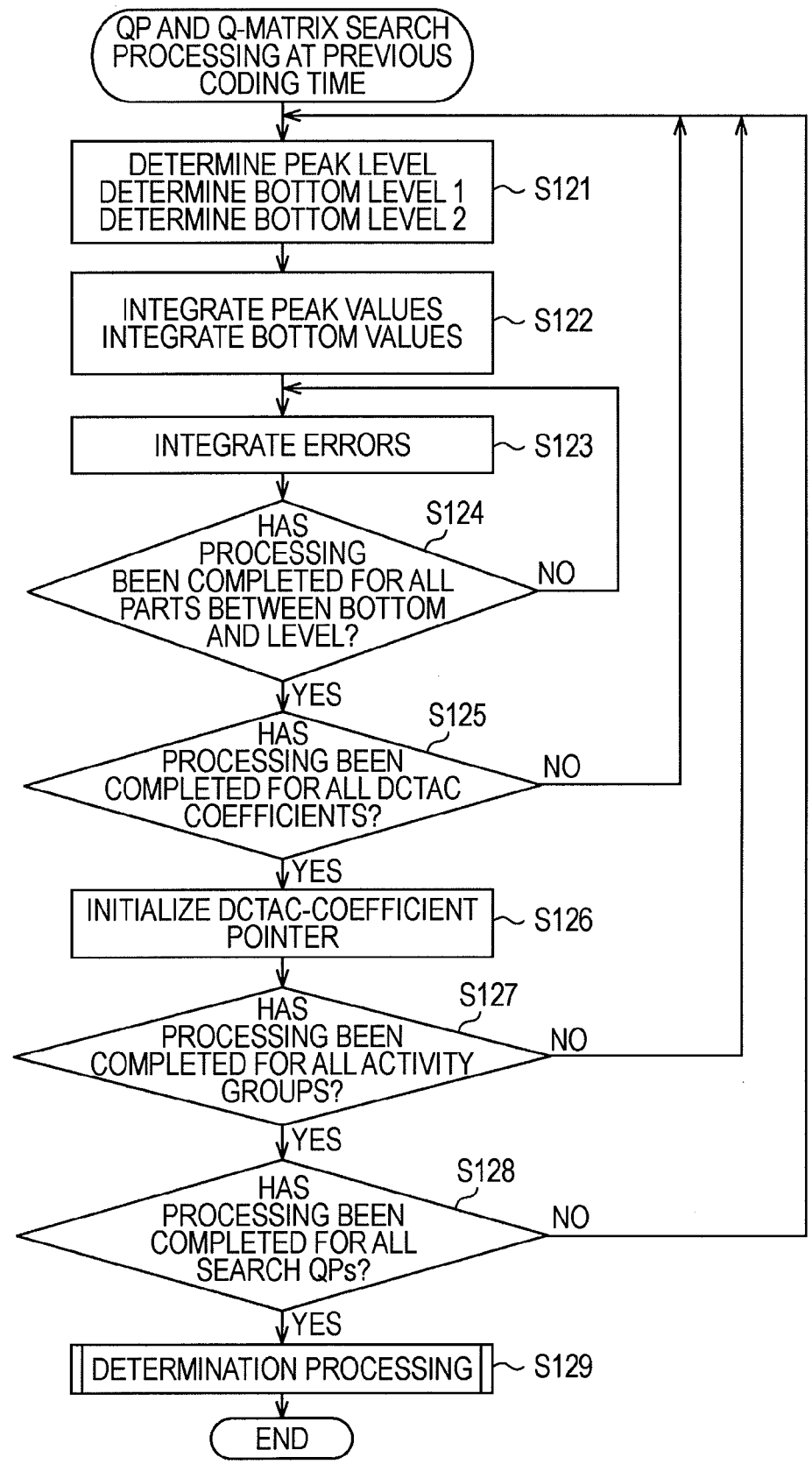
FIG. 9 is a flowchart further illustrating search processing of QP and Q Matrix at the previous coding time of step S108 in FIG. 8.

In the following, a description will be further given of the search processing of the quantization parameters QP and the quantization matrix Q Matrix at previous coding time of step S108 with reference to a flowchart in FIG. 9.

First, a determination is made on the peak level (t[0]) showing the quantization level of the quantization parameter QP, and the bottom level 1 (t[1]) showing the level of QP/2 and the bottom level 2 (t[2]) showing the level of 3QP/2 by the following expression (step S121).

$$qp = \text{sch\_}qp + \text{Adapt}Qp\text{Delta}[\text{activity\_group}]$$

where sch_qp is a variable which changes about ±6 in the vicinity of the quantization parameter QP obtained by the amount-of-code prediction processing.

$$t[0] = (((Q\_\text{Matrix}[\text{mid}][\text{pos}] * 2^{(qp/6)})/16$$

$$t[0] = t[0]/2$$

$$t[2] = t[0] + t[1]$$

where Q_Matrix[mid][pos]* indicates the value of the Q Matrix of the mid type and the pos-th number of 4×4 DCT block.

Next, the processing is performed on the integration (p[mid][qp]) of the count value of the peak level, and on the integration (b[mid][qp]) of the count value of the bottom level 1 (step S122).

$$p[\text{mid}][qp] \mathrel{+}= \text{Count}[\text{activity\_group}][\text{pos}][t[0]]$$

$$b[\text{mid}][qp] \mathrel{+}= \text{Count}[\text{activity\_group}][\text{pos}][t[1]];$$

Then, an error (rest[mid][qp]) of the quantization level of QP is integrated (step S123).

$$\text{rest}[\text{mid}][qp] \mathrel{+}= \text{abs}(t[0] - \text{lev}) * \text{Count}[\text{activity\_group}][\text{pos}][\text{lev}];$$

where lev is a variable changing from t[1] to t[2]. The values p[mid][qp], b[mid][qp], and rest[mid][qp] are parameters indicating an average distribution of all the samples by integrating all activity_group and quantization AC coefficients pos.

In this manner, a determination is made on whether the processing has all been completed between the bottom levels (step S124). The processing of step S123 is repeated until the processing has all been completed. If completed all the processing, a determination is made on whether all DCT AC coefficients have been processed (step S125).

In step S125, the processing from step S121 to step S125 is repeated until the processing has been all completed. If all the processing has been completed, a DCT-AC coefficient pointer is initialized (step S126), and a determination is made on whether the processing has been completed for all the activity groups (step S127). If not processed for all the activity groups, the processing returns to step S121, and the above-described processing is repeated. On the other hand, if the processing has been completed for all the activity groups, a determination is made on whether the processing has been completed for all the quantization parameters QP (step S128).

In step S128, if the processing has not been completed for all the quantization parameters QP to be searched, the processing returns to the above-described step S121, and the above-described processing is repeated. On the other hand, if the processing has been completed for all the quantization parameters QP to be searched, a determination processing is performed (step S129), and a series of processing is terminated in this manner.

Figure 10:
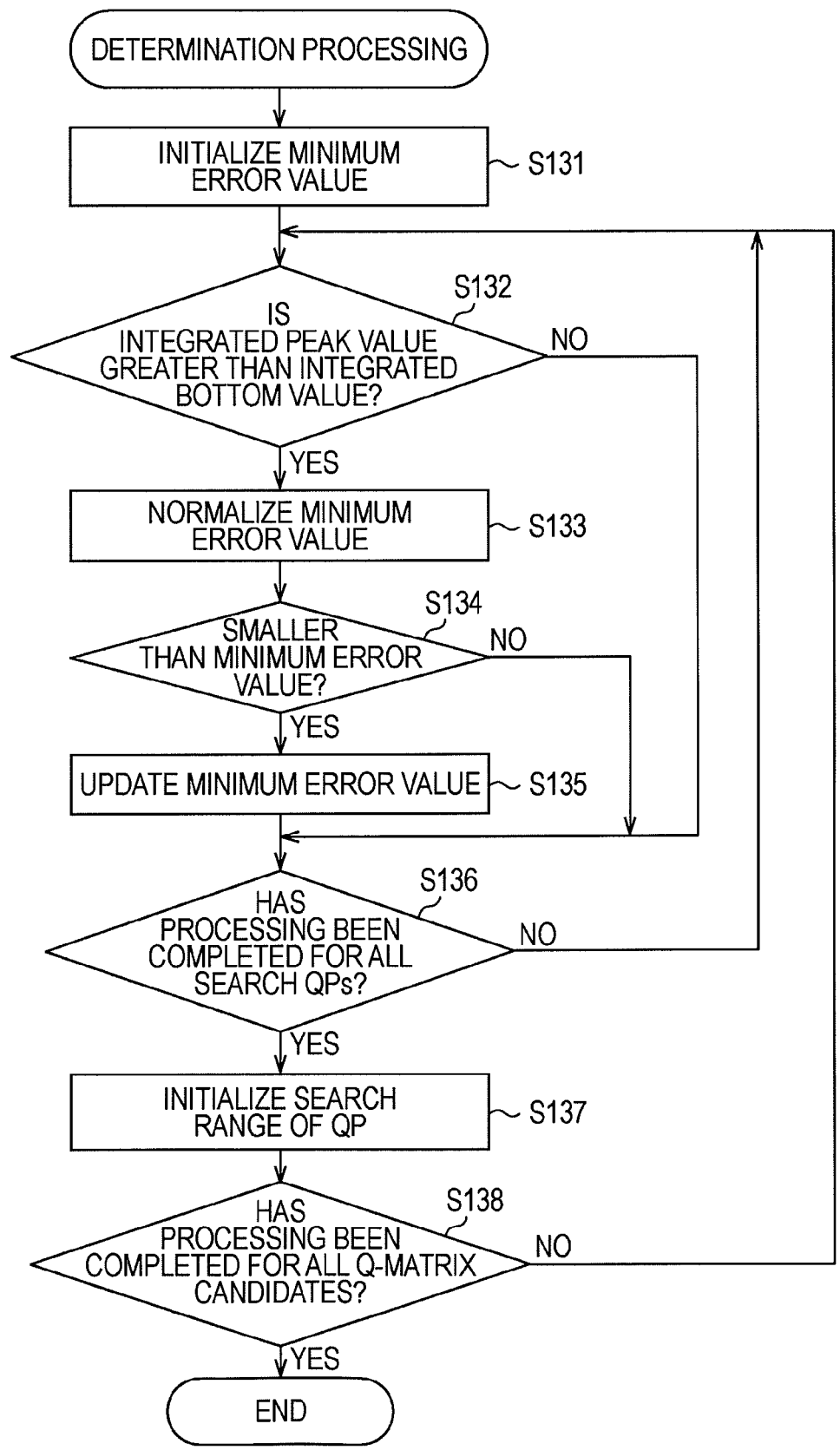
FIG. 10 is a flowchart illustrating determination processing of step S129 in FIG. 9.

Next, a description will be given in further detail of the determination processing of step S129 in FIG. 9 with reference to a flowchart in FIG. 10.

Here, the quantization matrix Q Matrix and the quantization parameters QP of the picture at the time of previous coding are obtained using p[mid][qp], b[mid][qp], and rest[mid][qp]. In this regard, step S131 and step S137 can be omitted.

First, a minimum error value (min_rest_norm) is initialized by rest[0][0], etc. (step S131). Next, a determination is made on whether the integration value of the peak values is greater than the integration value of the bottom values (step S132). Here, if the integration peak value is not greater than the integration bottom value, the processing proceeds to step S136. On the other hand, if the integration peak value is greater than the integration bottom value, the normalized value by the difference between the peak level and the bottom level, rest_norm, is obtained (step S133).

$$\text{rest\_norm} = \text{rest}[\text{mid}][qp]/(p[\text{mid}][qp] - b[\text{mid}][qp])$$

Next, a determination is made on whether rest_norm is smaller than the minimum error value (step S134). If it is smaller than the minimum error value, the minimum error value is updated (step S135), and the processing proceeds to step S136.

The processing of step S135 is the processing performed only in the case of detecting a discrete distribution state, and the following operation is performed: min_rest_norm=rest_norm. Also, among all the quantization matrices Q Matrix and the quantization parameters QP (sch_qp) to be searched, the Q Matrix, indicated by sch_qp and mid, having a minimum rest_norm represents the quantization parameter QP of the picture and the quantization matrix Q Matrix, which have been used in the previous coding. When the processing is not called at all, it is the case where a discrete state of the quantization is not detected, and this case is regarded as an original image that has not been previously coded at all.

Next, a determination is made on whether all the quantization parameters QP to be searched have been processed (step S136). If all the quantization parameters QP to be searched have not been processed, the processing returns to step S132, and the above-described processing is repeated. On the other hand, if all the quantization parameters QP to be searched have been processed, the search range of the quantization parameters QP is initialized (step S137), and a determination is made on whether all the candidates of the quantization matrix Q Matrix have been processed (step S138). Here, if the all the candidates have not been processed, the processing returns to step S132, and the above-described processing is repeated. On the other hand, if all the candidates have been processed, a series of processing is terminated.

Figure 11:
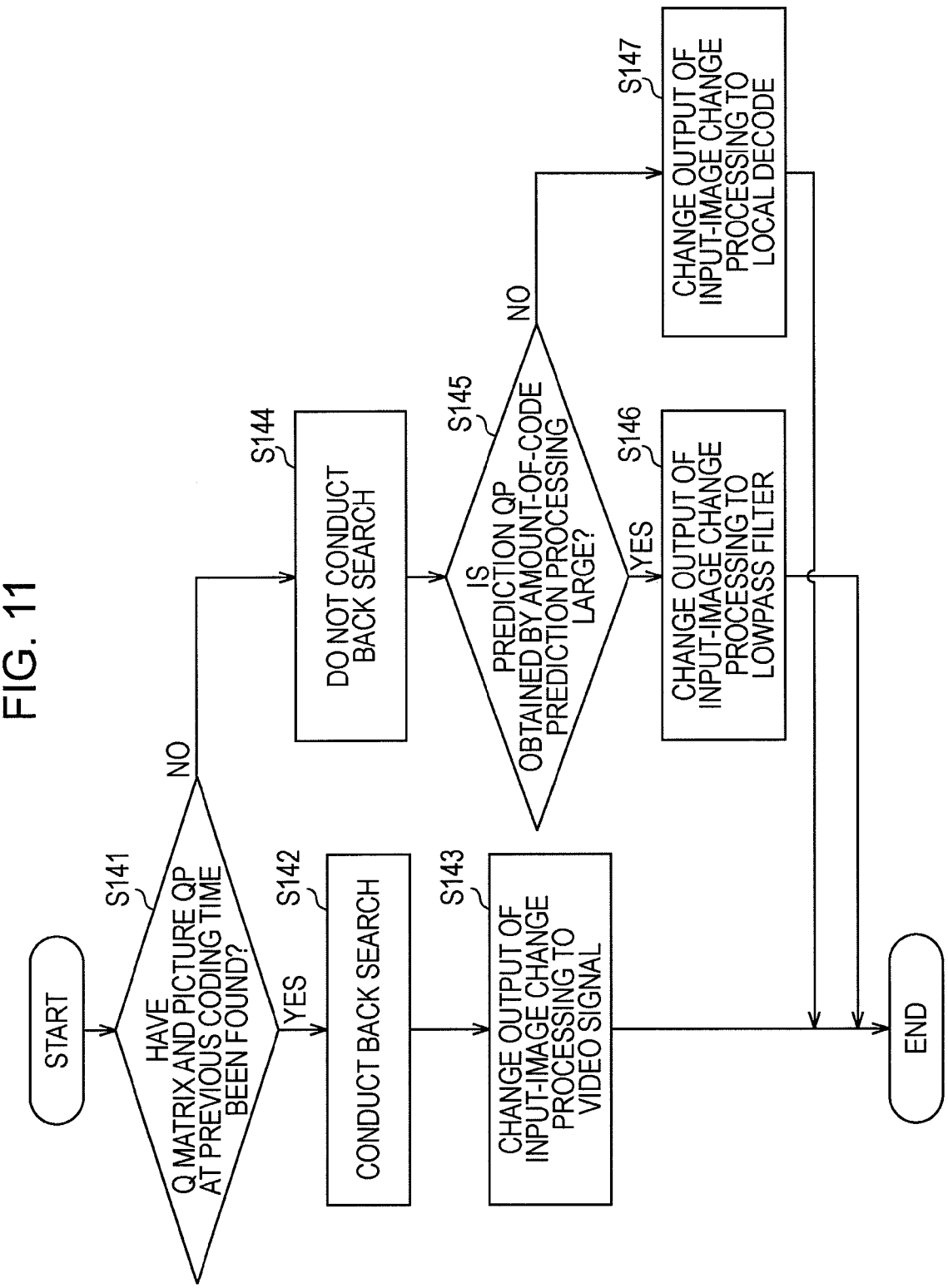
FIG. 11 is a detailed flowchart illustrating input-image change processing.

Next, a description will be given in detail of the input-image change processing with reference to a flowchart in FIG. 11. By the above-described processing of FIG. 10, it is possible to detect whether the input signal is of the original image or the image coded previously. Thus, by changing the input signal on the basis of this condition, lowpass filter processing is performed on the original image whose distortion is apt to be conspicuous, and in the case of the coded image, the input video signal is used to perform back search in order to improve efficiency.

That is to say, a determination is made on whether the quantization matrix Q Matrix and the quantization parameters QP of the picture at the time of previous coding have been found (step S141). If found, the back-search section 212 is used (step S142), and the input-image change processing section 203 outputs the input image (step S143). On the other hand, in step S141, if the quantization matrix Q Matrix and the quantization parameters QP of the picture at the time of previous coding have been not found, the back-search section 212 is not used (step S144), and a determination is made on whether the predicted QP obtained by the amount-of-code prediction processing is large (step S145). Here, if the predicted quantization parameter QP obtained by the amount-of-code prediction processing is large, the input-image change processing section 203 outputs the signal from the lowpass-filter processing section 201. If not large, the input-image change processing section 203 outputs the local decode of the buffer 209 (step S147), and the processing is terminated.

As described above, by the second embodiment of the present invention, it is possible to determine whether to change pre-filter processing to be used only for the first time by determining on whether the signal has been subjected to the previous coding with high precision from the discrete distribution state after the DCT. It is therefore possible to maintain the dubbing characteristic while improving the subjective image quality of the first image. Also, in the case of a signal coded previously, the detection efficiency of the back search is improved using the input image for a prediction image. It is possible to reduce the calculation of the back search section by determining the average quantization parameter QP of the picture (slice) determined from the distribution state and the quantization matrix Q Matrix.

A description has been given of embodiments of the present invention. However, the present invention is not limited to this. It is possible for those skilled in the art to perform various modifications and alternations without departing from the spirit of the present invention.

For example, it is also possible for a computer to perform the functions of the above-described image coding apparatus and method by programs, or achieve the functions as a recording medium recording the programs.

What is claimed is:

1. An image coding apparatus for coding image data, comprising:

first coding means for predicting a quantization parameter and a quantization matrix to be used for calculating a target amount of code for the image data by coding the image data;

second coding means for correcting the quantization parameter predicted by the first coding means from an error between an amount of generated code produced by coding using the quantization parameter and the quantization matrix predicted by the first coding means and the target amount of code; and third coding means for coding the image data using the quantization parameter corrected by the second coding means.

2. The image coding apparatus according to claim 1, wherein the first coding means includes count means for counting a number of occurrences at each quantization parameter from a number of occurrences at a minimum value among the quantization parameters, and calculation means for calculating entropy at each quantization parameter from a number of occurrences counted by the count means.

3. The image coding apparatus according to claim 2, wherein the first coding means obtains the quantization parameter for calculating the target amount of code on the basis of a predicted amount of generated code predicted on each quantization parameter from the entropy calculated by the calculation means.

4. The image coding apparatus according to claim 2, wherein the count means counts the number of occurrences at each quantization parameter for each position of a DCT transform block.

5. The image coding apparatus according to claim 2, further comprising activity calculation means for calculating activity from the image data, and group means for dividing macro blocks into groups in accordance with the activity calculated by the activity calculation means, wherein the number of occurrences at each quantization parameter is counted for each group divided by the group means.

6. The image coding apparatus according to claim 1, wherein the first coding means calculates the quantization parameter at the time of using for the quantization matrix when the quantization matrix predicted by the first coding means is not flat.

7. A method of coding an image, comprising the steps of:

first coding for predicting a quantization parameter and a quantization matrix to be used for calculating a target amount of code for the image data by coding the image data;

second coding for correcting the quantization parameter predicted by the step of first coding from an error between an amount of generated code produced by coding using the quantization parameter and the quantization matrix predicted by the step of first coding and the target amount of coding; and third coding for coding the image data using the quantization parameter corrected by the step of second coding.

8. An image coding apparatus for coding image data, comprising:
- a first coding mechanism predicting a quantization parameter and a quantization matrix to be used for calculating a target amount of code for the image data by coding the image data;
- a second coding mechanism correcting the quantization parameter predicted by the first coding means from an error between an amount of generated code produced by coding using the quantization parameter and the quantization matrix predicted by the first coding mechanism and the target amount of code; and
- a third coding mechanism coding the image data using the quantization parameter corrected by the second coding mechanism.

* * * * *